United States Patent
Alonso Alarcon et al.

(10) Patent No.: US 8,452,894 B2
(45) Date of Patent: May 28, 2013

(54) USER DATA CONVERGENCE (UDC) NOTIFICATION MANAGEMENT

(75) Inventors: Antonio Alonso Alarcon, Getafe (ES); Emiliano Merino Vazquez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 13/376,443

(22) PCT Filed: Dec. 9, 2009

(86) PCT No.: PCT/IB2009/007705
§ 371 (c)(1),
(2), (4) Date: Dec. 6, 2011

(87) PCT Pub. No.: WO2010/143014
PCT Pub. Date: Dec. 16, 2010

(65) Prior Publication Data
US 2012/0089993 A1    Apr. 12, 2012

Related U.S. Application Data

(60) Provisional application No. 61/186,240, filed on Jun. 11, 2009.

(51) Int. Cl.
*H04W 4/00* (2009.01)

(52) U.S. Cl.
USPC ..... 709/242; 455/433; 455/435.1; 455/435.3; 719/318

(58) Field of Classification Search
CPC ....................................... H04W 8/10
USPC ............. 719/318; 709/242; 455/433, 435.1, 455/435.3
See application file for complete search history.

(56) References Cited

U.S. PATENT DOCUMENTS

| 6,651,063 B1 | 11/2003 | Vorobiev |
| 2004/0098499 A1 | 5/2004 | Tamai |

FOREIGN PATENT DOCUMENTS

| JP | 2003152783 A | 5/2003 |
| JP | 2004110611 A | 4/2004 |
| JP | 2004158977 A | 6/2004 |

OTHER PUBLICATIONS

3GPP, "3$^{rd}$ Generation Partnership Project; Technical Specification Group Services and System Aspects; Service requirement for the User Data Convergence (UDC) (Release 9)", TR 22.985, V9.0.0 (Dec. 2008), pp. 1-16 [retrieved from http://www.3gpp.org].*

(Continued)

*Primary Examiner* — H S Sough
*Assistant Examiner* — Brian Wathen
(74) *Attorney, Agent, or Firm* — Coats & Bennett, P.L.L.C.

(57) ABSTRACT

A method and arrangement in a User Data Repository, UDR, (30) for selecting an Application Front End (34a-34e) in a communication network to receive an event notification. An associated Application Type and Group Identifier, identifying an accessible portion of the network, are stored in a database (88) for each of a plurality of Application Front Ends. The Group Identifiers may be updated in the database if predefined conditions (87) are met, for example when a UDR operation requests modifying user data. When a subsequent event notification procedure is initiated, the UDR (30) selects an Application FE to receive the event notification based on the Application Type and Group Identifier of the selected Application FE. Load-distribution weights may also be assigned to each of the Application FEs, and may be considered in the selection process.

19 Claims, 8 Drawing Sheets

OTHER PUBLICATIONS

3rd Generation Partnership Project. "Technical Specification Group Core Network and Terminals; User Data Convergence; Technical Realization and Information Flows." 3GPP TS 23.335, Stage 2, Release 9, May 30, 2009, pp. 1-10.

* cited by examiner

USER DATA CONVERGENCE (UDC) NOTIFICATION MANAGEMENT

RELATED APPLICATIONS

This application claims the benefit of U.S. Provisional Application No. 61/186,240 filed Jun. 11, 2009.

TECHNICAL FIELD

The present invention relates generally to communication networks, and in particular, to a system and method for managing User Data Convergence (UDC) notifications between a User Data Repository (UDR) and a plurality of Application Front Ends (Application FEs) in a communication network.

BACKGROUND

User Data Convergence (UDC) is currently is being developed by the Third Generation Partnership Project (3GPP). The technical specification 3GPP TS 23.335 describes the technical realization of UDC, which separates the user data from the application logic of different network elements. A User Data Repository (UDR) provides a centralized database, which is accessed by different Application FEs.

Figure 1:
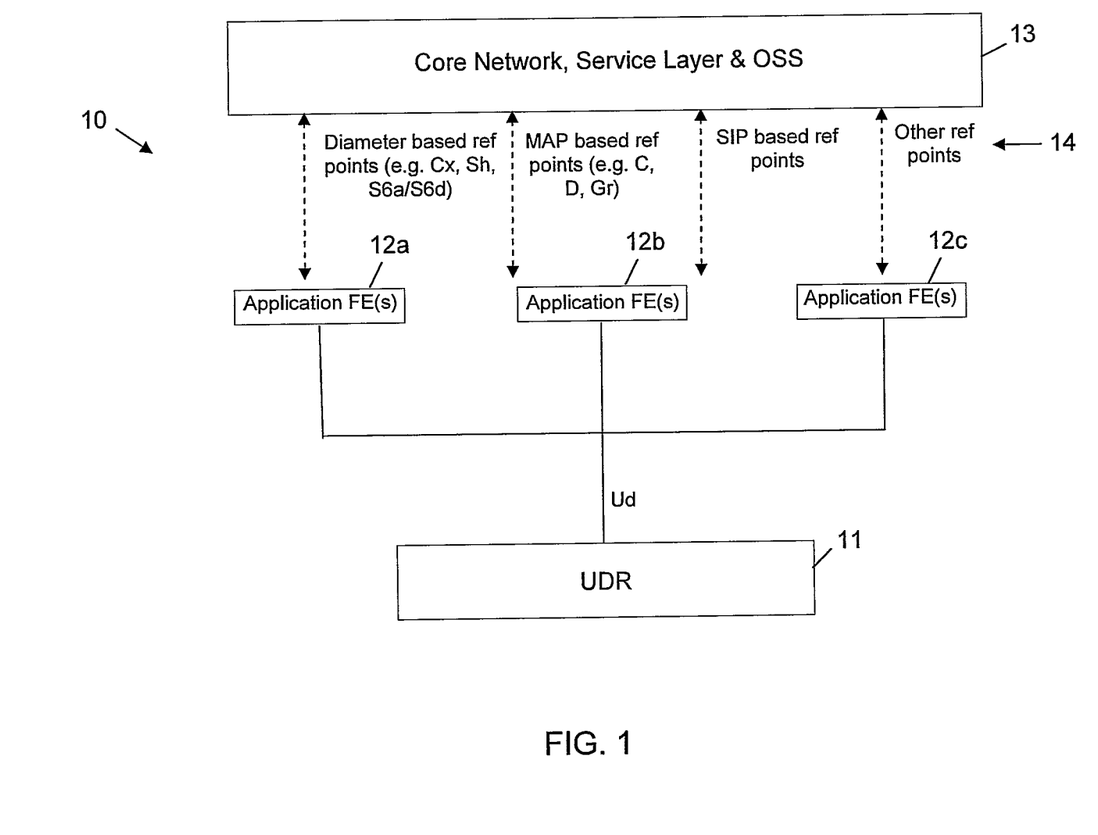
FIG. 1 is a simplified block diagram of a generic UDC architecture.

FIG. 1 is a simplified block diagram of a generic UDC architecture 10. The user data is stored in the UDR 11. Application Front Ends (FEs) 12a-12c are data-less functional entities. The Application FEs retain the application logic of functional network entities such as a Home Location Register (HLR), Home Subscriber Server (HSS), Authentication Center (AUC), Application Server (AS), Provisioning system, and the like, but do not locally store user data permanently. The Application FEs may handle one or several applications simultaneously. The UDC architecture interfaces with a Core Network, Service Layer, and Operation and Support System (OSS) 13 via protocols 14 such as Diameter, Mobile Application Protocol (MAP), Session Initiation Protocol (SIP), or other suitable protocols. A requirement of the UDC implementation is to minimize the impact on the existing network.

Figure 2:
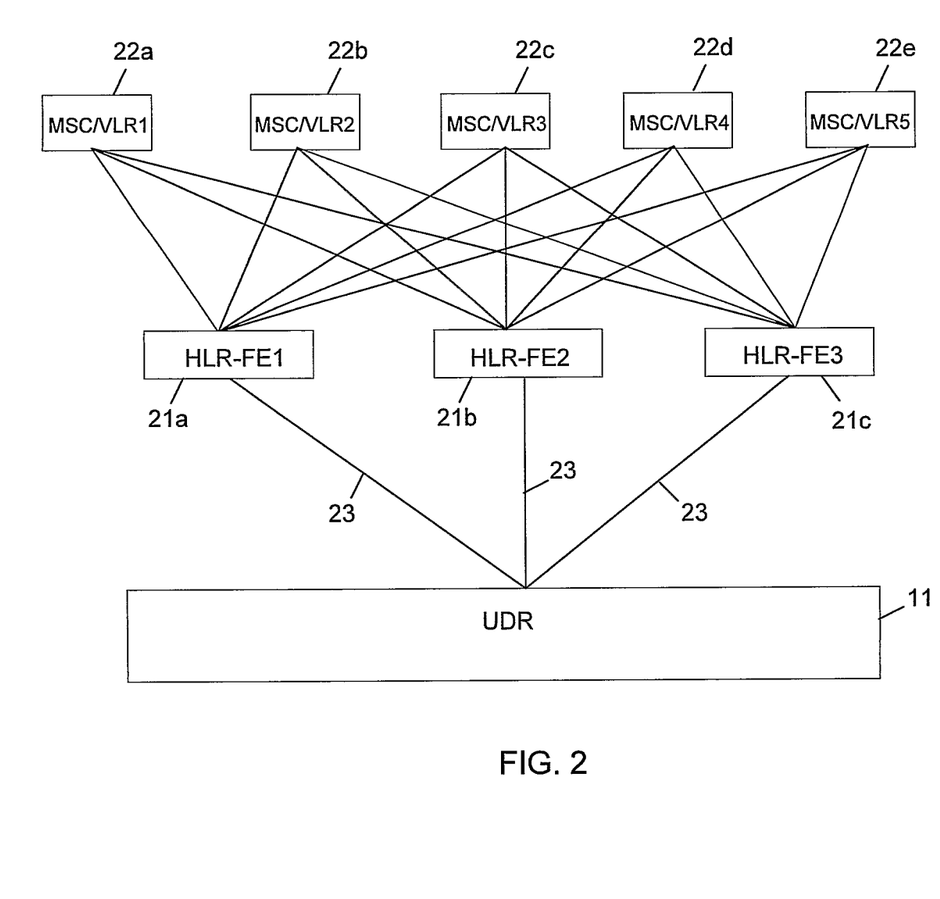
FIG. 2 is a simplified block diagram of a UDC architecture in which the UDR provides user data for a plurality of FEs implemented as HLR-FEs.

FIG. 2 is a simplified block diagram of a UDC architecture in which the UDR 11 provides user data for a plurality of Application FEs implemented as HLR-FEs 21a-21c. The HRL-FEs, in turn, support a plurality of MSC/VLRs 22a-22e. As it is apparent, each Application FE is configured with an individual identifier usually known as "FrontEnd Identifier", which is used to establish communications with other entities of the architecture. The interface 23 between the UDR and the HLR-FEs supports notifications functionality which allows the UDR to notify a relevant HLR-FE about specific events which may occur to specific user data in the UDR. The events may be changes to existing user data, addition of user data, and so on. The core network and service layer applications may explicitly subscribe to these notifications. For example, an AS (as an example of Application FE) may subscribe to receive changes to specific user data. Alternatively, the core network and service layer applications may implicitly subscribe to notifications according to the UDC concept. For example, a notification that a user is located and his location may be administratively cancelled.

It is assumed that any Application FE of a specific application type such as "HLR" is suitable for handling notifications towards any of the elements in the Core Network/Service Layer/OSS associated with that application type. Thus, in FIG. 2 it is assumed that the UDR 11 can notify any HLR-FE 21a-21c of a user data change, and the notified HLR-FE can notify any of the MSC/VLRs 22a-22e regardless of the conditions (e.g., the user's geographical location). Therefore, the UDR is not concerned about sending the notification to a specific HLR-FE.

Some operators with large networks, however, may utilize a routing hierarchy in which their overall network is divided into a number of area networks connected, for example, by Signaling Transfer Points (STPs). In this network configuration, an HLR-FE in a first area network might not have a "direct" signaling connection to an MSC/VLR in a second area network, but an "indirect" connection wherein the signaling is routed through one or more STPs. Also, given that meshing all-with-all the nodes in a communications network usually requires complex and expensive developments, it might happen than an HLR-FE might not have signaling connections with e.g. all the MSC/VLRs in other geographical location areas. Thus, for a data change affecting a particular MSC/VLR, the UDR must manage its HLR-FE selection so that the UDR does not select an HLR-FE that is not capable of reaching the affected MSC/VLR.

SUMMARY

Currently there is no mechanism specified in 3GPP to solve this problem, since it is assumed that all Application FEs will reach all defined area networks. In the current specification, the UDR selects any Application FE to send notifications on data changes (e.g., provisioning), regardless of the user and regardless of the "location" of the user. Therefore, the UDR may send notifications to an Application FE that cannot provide it to the network element where the notification is needed. The present invention provides a method and arrangement for managing UDC notifications between the UDR and a plurality of Application FEs, which solves this problem.

In one embodiment, the present invention is directed to a method in a UDR for selecting an Application FE from a plurality of Application FEs in a communication network to receive an event notification. The method includes the step of populating a database with an Application Type and Group Identifier associated with each of the plurality of Application FEs, wherein each Group Identifier identifies a different portion of the communication network accessible through the associated Application FE. The method also includes subsequently initiating an event notification procedure to report a change of user data for an identified user; and selecting an Application FE to receive the event notification based on the Application Type and Group Identifier of the selected Application FE. The database may be populated by storing the Application Type and Group Identifier for each of the Application FEs when a UDR operation request is received from one of the Application FEs. The Group Identifier for a given Application FE may be updated in the database if predefined conditions are met.

Optionally, the method may include assigning a load-distribution weight to each of the plurality of Application FEs, and also basing the selection of the Application FE on the assigned load-distribution weights.

In another embodiment, the present invention is directed to an arrangement in a UDR for selecting an Application FE from a plurality of Application FEs in a communication network to receive an event notification. The arrangement includes means for populating a database with an Application Type and Group Identifier associated with each of the plurality of Application FEs, wherein each Group Identifier identifies a different portion of the communication network accessible through the associated Application FE; means for subsequently initiating an event notification procedure to report a change of user data for an identified user; and means for selecting an Application FE to receive the event notification based on the Application Type and Group Identifier of the selected Application FE. The means for populating the database may be adapted to store the Application Type and Group Identifier for each of the Application FEs when a UDR operation request is received from one of the Application FEs. The Group Identifier for a given Application FE may be updated in the database if predefined conditions are met.

Optionally, the means for selecting an Application FE to receive the event notification may be adapted to also select the Application FE based on load-distribution weights assigned to each of the plurality of Application FEs, wherein a given Application FE is assigned a high load-distribution weight if the given Application FE has a direct connection to a service node serving the identified user, and is assigned a low load-distribution weight if the given Application FE has only an indirect connection to the service node serving the identified user.

The present invention advantageously takes into account network topology considerations for UDR notification-related purposes. The invention covers deployments in which not all core network elements are connected to all involved Application FE(s). The invention provides flexibility for UDR notification-related load distribution mechanisms by using the GroupId and the load-distribution weight. As a result, the notification-related load can be distributed accordingly. The invention also provides a scalable solution for UDR notification-related purposes because only a modification in the UDR configuration of the involved GroupId is required in order to add more Application FEs. Finally, the invention provides a fault tolerance solution for UDR notification-related purposes because the UDR can select among all Application FEs sharing a specific GroupId value to issue a notification.

DETAILED DESCRIPTION

Figure 3:
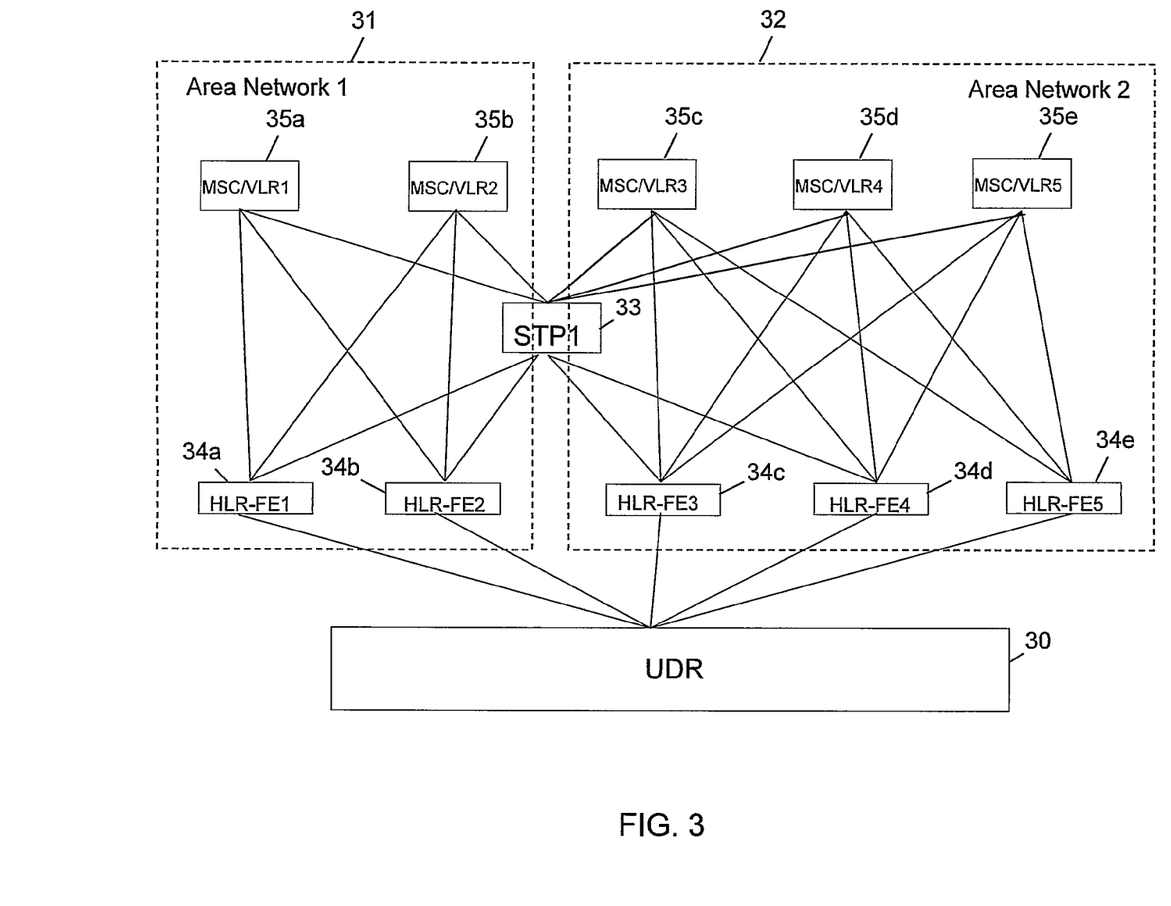
FIG. 3 is a simplified block diagram of a UDC architecture suitable for implementing the present invention.

FIG. 3 is a simplified block diagram of a UDC architecture suitable for implementing the present invention. An operator's overall network is divided into a first area network (Area Network 1) 31 and a second area network (Area Network 2) 32 connected by a Signaling Transfer Point (STP1) 33. In this network configuration, a modified UDR 30 provides user data for a plurality of Application FEs implemented as HLR-FEs 34a-34e. The HRL-FEs, in turn, support a plurality of MSC/VLRs 35a-35e. However, not all of the HLR-FEs are able to reach all of the MSC/VLRs. For example, HLR-FE5 located in Area Network 2 is unable to reach MSC/VLR1 or MSC/VLR2 located in Area Network 1. In some other cases, some HLR-FEs are able to reach MSC/VLRs indirectly only through STP1. For example, HLR-FE3 located in Area Network 2 is able to reach MSC/VLR1 located in Area Network 1 only through STP1. In these cases, even though access is possible, the operator may desire to use the shortest path to reach MSC/VLR1. For example, HLR-FE3 might not be the best choice to reach MSC/VLR1, since the "direct" paths from HLR-FE1 or HLR-FE2 are more optimal, as they do not require routing signaling through any STP.

To ensure that notifications reach the applicable MSC/VLR and to ensure that optimal paths are utilized, the UDR must make a routing determination when deciding where to send an issued notification. For example, when the Core Network decides a circuit-switched/packet-switched (CS/PS) user is going to be managed by a MSC/VLR located in Area Network 1, a "MAP Location Update" operation is sent from MSC/VLR1 or MSC/VLR2 towards HLR-FE1 or HLR-FE2 (normal case). Later, the UDR may need to send an HLR-related notification for this user. For example, a CS/PS-related attribute for this user has been changed in the UDR by the provisioning entity and this new data needs to be updated in the MSC/VLR element currently "hosting" this user. In this case, the optimal choice would be for the UDR to select HLR-FE1 or HLR-FE2 to deliver the notification to MSC/VLR1 or MSC/VLR2. HLR-FE3 or HLR-FE4 would not be the best choice since the final MAP operation triggered by this UDR notification would have to go through STP1 to reach MSC/VLR1 or MSC/VLR2, which may not be desired due to latency reasons. Note that the UDR should never send the notification related to this CS/PS user to HLR-FE5, since HLR-FE5 has no connection to STP1 and thus no way to reach any MSC/VLR located in Area Network 1.

The present invention introduces new parameters for configuring Application FEs in an operator's network. Additional information is stored in the UDR 30 that enables the UDR to select the proper Application FE(s) to which to send an issued notification, for example, when data of a certain user is/are modified.

According to 3GPP TS 23.335, each Application FE in an operator's network is configured defining its Application Type (e.g., AppType=HLR-FE, AppType=HSS-FE, and the like). The present invention also configures the Application FEs with a new parameter in the UDR: a "Group Identifier" (GroupId), which is associated with the "Area Network(s)" the Application FEs serve. If a particular Application FE serves more than one Area Network, the particular Application FE is configured in the UDR with a GroupId for each Area Network served. For example, HLR-FE3 in FIG. 3 is configured to belong to Area Network 2, but may also be configured to belong to Area Network 1 since HLR-FE3 can connect indirectly with MSC/VLRs in Area Network 1 through STP1 33.

As an example, all HLR-FEs may be configured with "AppType=HLR-FE" (the same AppType value for all), and they may be grouped in "Area Networks". Thus, all HLR-FEs deployed in the same Area Network share the same GroupId value, which is assigned to that Area Network. This information may be stored in the UDR or in a database accessible by the UDR. When an HLR-FE sends a retrieve/update request towards the UDR (commonly referred herein as "UDR operation request"), the UDR may obtain from the request, the AppType and GroupId values associated with the requesting HLR-FE. Preferably, the Application Type (AppType) of a certain Application FE is derivable from its Frontend Identifier, or from its corresponding Group Identifier (GroupId).

It should be noted that if LDAP is the UDR data-access interface, this may be accomplished by defining different "directory access credentials" entries, each having a specific AppType value and a specific GroupId value. All HLR-FEs establishing an LDAP session using the same "directory access credentials" entry share the same AppType and the same GroupId.

When an MSC/VLR requests to retrieve/update CS/PS user data through a selected HLR-FE, or when an S-CSCF requests to retrieve/update IMS user data through a selected HSS-FE, the selected HLR-FE or HSS-FE accesses the UDR to retrieve/update the CS/PS user related data by means of a —so called— UDR operation request (e.g., a LDAP operation). The UDR checks this requested operation and determines whether or not to store at the user level (i.e., as a part of the data held by the UDR in relationship with a user), the GroupId value(s) associated with the selected HLR-FE or HSS-FE for the involved AppType. For example, each time an HLR-FE requests an operation towards the UDR to update the "CS Location Data" for a specific user (i.e., to update the user attribute storing the MSC/VLR entity currently managing that user), the UDR updates for that involved user the GroupId value associated with AppType=HLR-FE with the GroupId value(s) assigned to the specific HLR-FE issuing this update request.

Thereafter, the stored [AppType,GroupId value(s)] pair identifies for each stored/managed user in the UDR, the group of Application FEs of a specific Application Type that are available for reporting an issued notification related to this AppType for a particular user. The UDR may then utilize a pre-configured deterministic algorithm to load-distribute the notifications among the identified Application FEs. If all Application FEs for the specific AppType are equally valid for a certain area, the UDR does not need to be configured with the list of possible Application FEs since any Application FE may be used.

It should be noted that the stored [AppType,GroupId value(s)] pair applies to any notification to be issued for this user from the UDR to an Application FE (or group of Application FEs) belonging to this AppType. Thus, the [AppType, GroupId value(s)] pair is tied to the "user" and to a specific AppType, but not to any specific group of user-related attributes.

Figure 4:
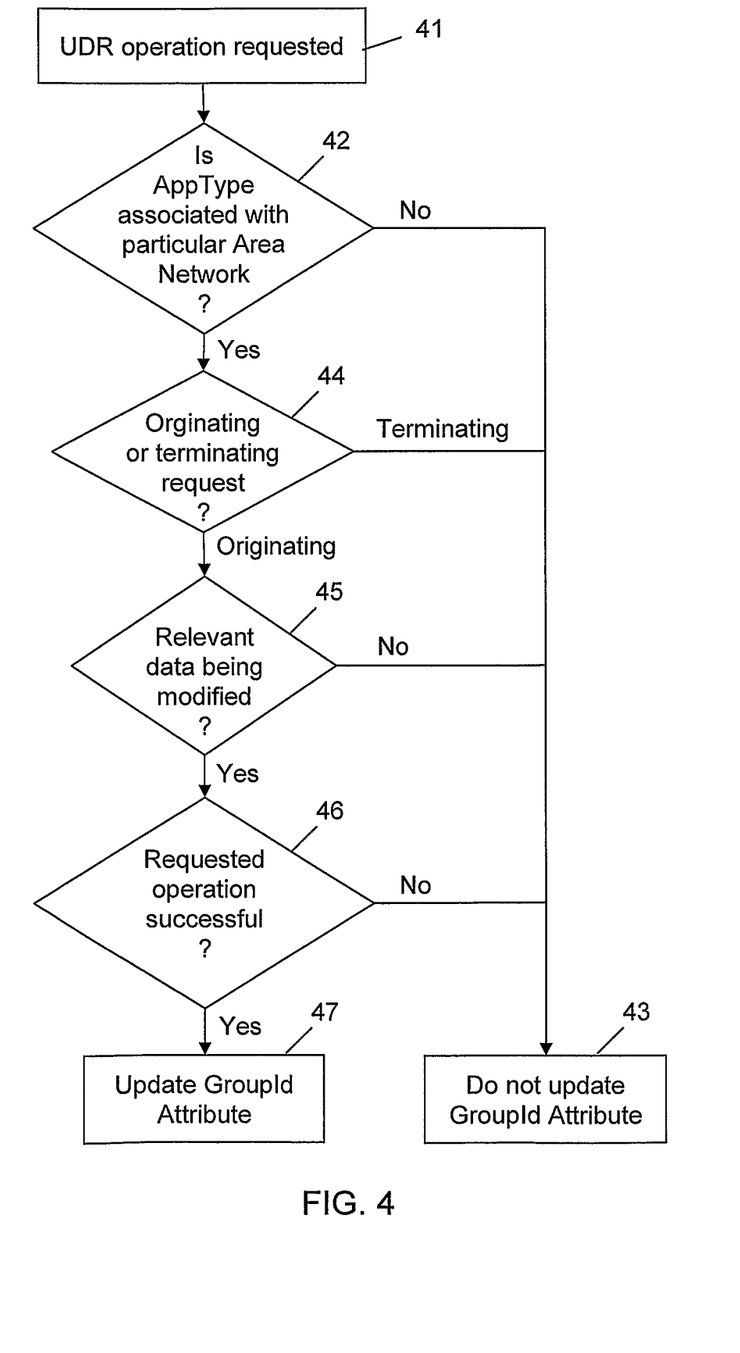
FIG. 4 is a flow chart illustrating the steps of an embodiment of a method of determining whether to update the GroupId attribute when a UDR operation is requested.

FIG. 4 is a flow chart illustrating the steps of an embodiment of a method of determining whether to update the GroupId attribute when a UDR operation is requested at step 41. The UDR operations, as requested from any of the FEs (e.g. HLR-FEs 34a-34e) to the UDR, include an identifier usable for addressing data of the concerned user(s) in the UDR. For each AppType known by the UDR, a set of criteria/conditions is specified for determining whether or not the UDR is to store/update the GroupId value(s) of the last Application FE requesting to retrieve/update data of a specific user (referred herein as "user application data", or "user data"). The conditions illustrated in FIG. 4 are exemplary only, and additional conditions may also be considered when determining whether or not the UDR is to store/update the GroupId value(s) of the last Application FE requesting to retrieve/update user data for a specific user.

At step 42, it is determined whether the Application Type (AppType) associated with the Application FE sending the request is associated with a particular Area Network. For example, an AppType=HLR or AppType=HSS may require updating since HLRs and HSSs are associated with particular Area Networks. If the AppType is not associated with a particular Area Network, the method moves to step 43, and the GroupId value is not updated. If the AppType is associated with a particular Area Network, the method moves to step 44, where it is determined whether the database operation being requested by the Application FE is an originating request such as an update or create request, or a terminating request such as a retrieve or delete request. Typically, when the requested operation is an update, the UDR stores the GroupId value(s) since this information is relevant for knowing which Application FE is handling the user for originating requests (for example, IMS registration). For terminating requests, the operation performed is a data retrieve, which typically does not result in updating the GroupId in the UDR. Therefore, if the database operation being requested by the Application FE is a terminating request, the method moves to step 43, and the GroupId value is not updated.

If the database operation being requested by the Application FE is an originating request, the method moves to step 45, where it is determined whether the user application data being modified is relevant to the GroupId. This (relevant/not-relevant) factor may depend on the type of data being modified, and can be an attribute associated in the UDR to certain data types, such as user location related data (e.g., assigned MSC/VLR name, or assigned S-CSCF name, user data related to certain services, etc). For example, if the S-CSCF name where a user is registered changes, the UDR stores the GroupId value because the user may have moved to another area (i.e., having a different GroupId value). Alternatively, if user data such as the user's forwarded-to number changes as a result of the operation, the UDR does not need to store/overwrite the GroupId value. Therefore, if the user application data being modified is not relevant to the GroupId, the method moves to step 43, and the GroupId value is not updated.

If the user application data being modified is relevant to the GroupId, the method moves to step 46, where it is determined whether the requested operation was successful in the UDR. If not, the method moves to step 43, and the GroupId value is not updated. If the requested operation was successful in the UDR, the method moves to step 47 where the GroupId value is updated.

Applicable conditions may be configured in the UDR associated with each AppType. For example, a set of conditions can be configured for AppType=HLR-FE; a set of conditions can be configured for AppType=HSS-FE; and so on.

It should be noted that in 3GPP TS 23.335, the UDR is currently required to authenticate Application FEs connecting to it and thus already stores authentication data for each Application FE. The new GroupId value is an additional attribute associated with each Application FE to be managed in the UDR.

Referring again to FIG. 3, an example of configuration parameters describing the deployed HLR-FEs 34a-34e configured in the UDR 30 is as follows:

HLR-FE1 ->[AppType=HLR-FE, GroupId=AN1]
HLR-FE2 ->[AppType=HLR-FE, GroupId=AN1]
HLR-FE3 ->[AppType=HLR-FE, GroupId=AN2]
HLR-FE4 ->[AppType=HLR-FE, GroupId=AN2]
HLR-FE5 ->[AppType=HLR-FE, GroupId=AN2]

Load distribution weights may also be stored for each Application FE. The weights may indicate the desirability of selecting a particular Application FE to send a notification to a particular user. According to the pre-configured GroupId values above, and with load-distribution weights also included, the UDR configuration for notification distribution purposes may be as follows:

(1) AppType=HLR-FE, GroupId=AN1
  HLR-FE1 (load-distribution weight: 100)
  HLR-FE2 (load-distribution weight: 100)
  HLR-FE3 (load-distribution weight: 1)
  HLR-FE4 (load-distribution weight: 1)
(2) AppType=HLR-FE, GroupId=AN2
  HLR-FE1 (load-distribution weight: 1)
  HLR-FE2 (load-distribution weight: 1)
  HLR-FE3 (load-distribution weight: 100)
  HLR-FE4 (load-distribution weight: 100)
  HLR-FE5 (load-distribution weight: 100)

Note that HLR-FE5 is not included in the list for GroupId=AN1 because HLR-FE5 is not capable of connecting to any MSC/VLR in Area Network 1. Note also that HLR-FEs that must connect to MSC/VLRs in the associated Area Network through STP1 are assigned a low load-distribution weight, while HLR-FEs that connect directly to the MSC/VLRs in the associated Area Network are assigned a high load-distribution weight. Of course, other load-distribution weights are possible in order to consider additional factors when selecting an FE.

Finally, the conditions in this example to update the GroupId attribute (managed at the user level) for AppType=HLR-FE may be as follows:

"Set of conditions" to update GroupId value for AppType=HLR-FE
  Operation requested: Update
    AND
  User data: CS/PS location data
    AND
  Operation result: success.

It should be noted that this set of conditions assures that when a MAP Location Update operation is issued for a specific user from an MSC/VLR towards a selected HLR-FE, the UDR 30 stores the GroupId value for the selected HLR-FE and associates it with the specific user.

When the UDR is configured as shown above, and a user is being managed by an MSC/VLR located in Area Network 1, and a notification associated with AppType=HLR-FE needs to be sent by the UDR towards an HLR-FE, the deterministic notification distribution algorithm configured in the UDR will distribute approximately 50 percent of notifications to HLR-FE1 and approximately 50 percent to HLR-FE2. In only a very few cases (for example when HLR-FE1 and HLR-FE2 are not reachable), the UDR will send the notification to HLR-FE3 or HLR-FE4, which forwards the notification through the STP1 to MSC/VLR1 or MSC/VLR2, as appropriate. In a similar manner, when a user is being managed by an MSC/VLR located in Area Network 2, notifications will normally be sent to HLR-FE3, HLR-FE4, or HLR-FE5 applying load sharing among them. In only a very few cases (for example when HLR-FE3, HLR-FE4, and HLR-FE5 are not reachable), the UDR will send the notification to HLR-FE1 or HLR-FE2, which forwards the notification through the STP1 to MSC/VLR3, MSC/VLR4, or MSC/VLR5, as appropriate.

Figure 5:
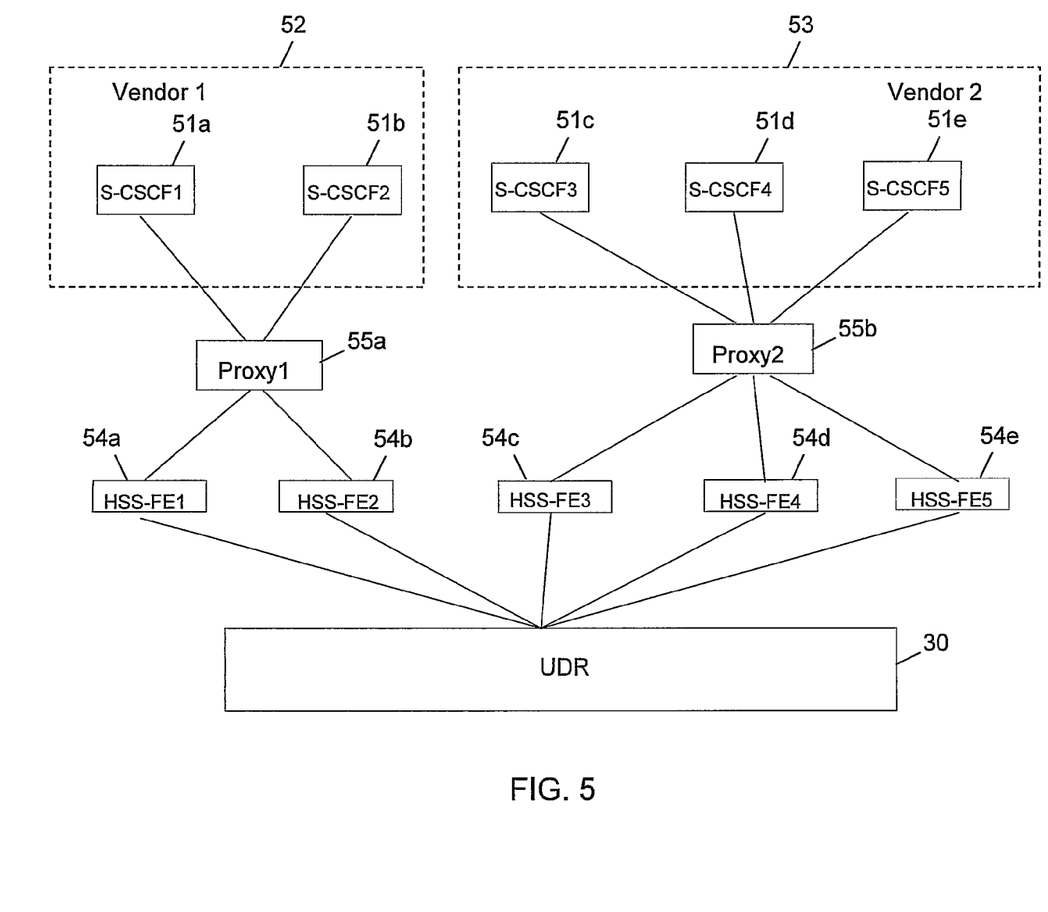
FIG. 5 is a simplified block diagram of a UDC architecture in which an operator has different S-CSCF vendors.

FIG. 5 is a simplified block diagram of a UDC architecture in which an operator has different S-CSCF vendors. S-CSCF1 and S-CSCF2 51a and 51b are provided by Vendor1 52. S-CSCF3, S-CSCF4, and S-CSCF5 51c-51e are provided by Vendor2 53. The S-CSCFs may be provided by different vendors, for example, because S-CSCF1 and S-CSCF2 are intended to serve specific users who can make use of presence service and priority service, only supported by Vendor1. The operator has a private and distributed network to provide these services.

The UDR 30 in this example connects to the various S-CSCFs through a plurality of HSS-FEs 54a-54e and through Diameter Proxy1 and Diameter Proxy 2 55a and 55b. A method of utilizing this architecture is described below referring to FIG. 6.

Figure 6:
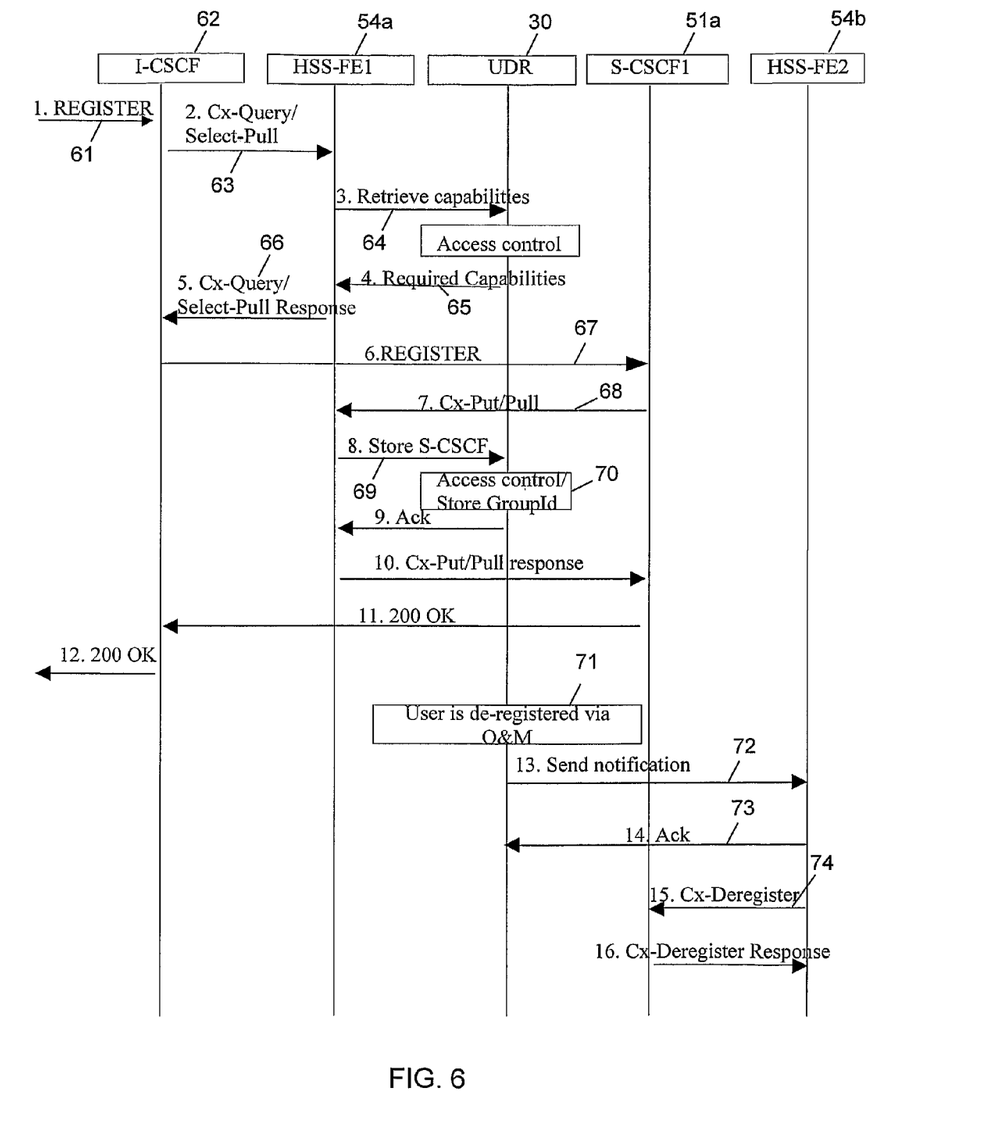
FIG. 6 is a signal flow diagram illustrating a method of registering and de-registering a user in an embodiment of the present invention.

FIG. 6 is a signal flow diagram illustrating a method of registering and de-registering a user in an embodiment of the present invention. With reference to FIGS. 5 and 6, a user who subscribes to priority service through Vendor1 52 (for example, a user who can request prioritization for certain calls in case the network is handling a high traffic load) performs IMS registration at step 61. Since only S-CSCF1 51a and S-CSCF2 51b are capable of serving this user, an Interrogating CSCF (I-CSCF) 62, which receives the Register message from the user, selects either S-CSCF1 or S-CSCF2 (in a load balancing configuration) during the registration procedure shown in steps 63-66 according to capabilities needed for the user. In this example, S-CSCF1 is selected and the Register message is forwarded to S-CSCF1 in steps 67-68.

When HSS-FE1 54a receives the diameter request from S-CSCF1 at step 68, HSS-FE1 sends an update command at step 69 to the UDR 30 to set the S-CSCF name where the user is served. The registration status is also changed. Note that since HSS-FE1 belongs to a new GroupId (i.e., Vendor1), the operator may configure different access rules than for S-CSCF3 (belonging to Vendor2). This may be needed to ensure priority service for the user. Upon receiving the update command, the UDR checks the conditions to store/not store the GroupId at step 70. Since the user was not previously registered, the condition is that the S-CSCF name is being updated. The UDR then stores the GroupId (Vendor1) and the AppType=HSS.

At a later time, the operator may decide to remove the priority service from the user. In this case, the user now may be served by any of the S-CSCFs of Vendor2. If the operator decides to move the user to an S-CSCF of Vendor2, the capability needed for this user is changed to do so. Since the capability of the user has changed, the operator administratively de-registers the user at step 71 so that a new S-CSCF is assigned. The conditions configured in the UDR (registration status is changed by application type=provisioning) trigger a notification towards an HSS-FE with the new status (not registered) and the S-CSCF name (S-CSCF1). By using the GroupId stored for the user for AppType=HSS, the UDR has the list of suitable HSS-FEs to send the notification (HSS-FE1 and HSS-FE2). The priority/weight configured for both of them is the same, so the UDR selects HSS-FE2 54b and sends the notification at step 72. Following an acknowledgment at step 73, HSS-FE2 sends a de-registration command towards S-CSCF1 at step 74.

The user is informed about this de-registration, so the User Equipment (UE) performs a new registration using procedures similar to those above. In such procedures (not shown), the I-CSCF selects a suitable S-CSCF for the user based on the new capability. For example, S-CSCF4 may be selected, which sends a diameter request to an HSS-FE such as HSS-FE5 54e. Upon receiving the subsequent update command from HSS-FE5, the UDR 30 checks the conditions to store/not store the GroupId. The condition is that the data updated is S-CSCF name (since the user was not registered, the S-CSCF name was empty). The UDR therefore stores the GroupId (Vendor2) and the AppType=HSS.

Figure 7:
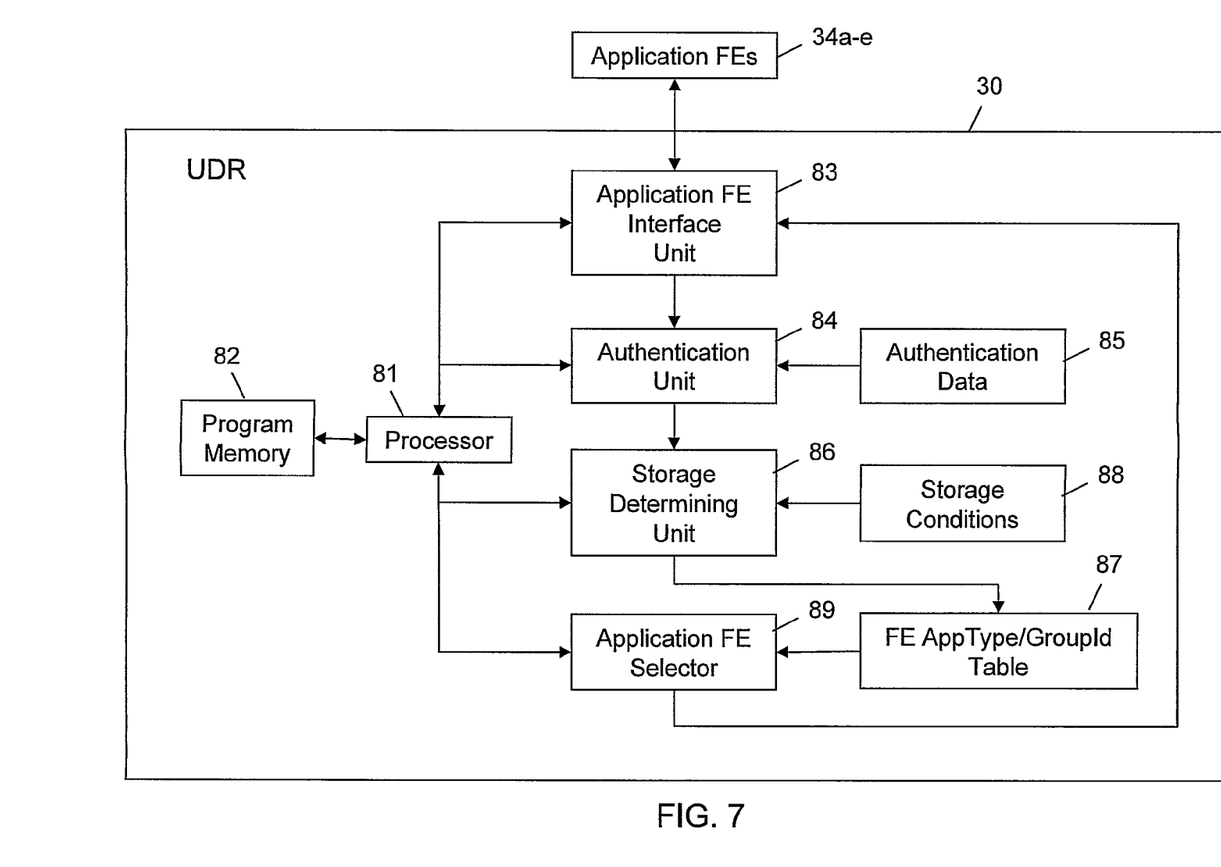
FIG. 7 is a simplified block diagram of a User Data Repository (UDR) modified in accordance with the teachings of the present invention.

FIG. 7 is a simplified block diagram of the UDR 30 modified in accordance with the teachings of the present invention.

Operation of the UDR may be controlled by a processor 81 running computer program software stored on a program memory 82. The UDR may utilize an Application FE Interface Unit 83 to communicate with Application FEs such as HLR-FE1 through HLR-FE5 34a-e, as described above in connection with FIG. 3. When a UDR operation request is received from an Application FE, an Authentication Unit 84 may utilize stored authentication data 85 to authenticate the requesting Application FE. If the UDR operation request is the first request received from this Application FE, a Storage Determining Unit 86 stores an FE AppType and GroupId for the requesting Application FE in an FE AppType/GroupId Table 87. If this is not the first UDR operation request from this Application FE, the Storage Determining Unit may utilize predefined storage conditions 88 to determine whether to store updated GroupId information for this requesting Application FE, as shown and described above in connection with FIG. 4. Upon a positive determination, the Storage Determining Unit updates the GroupId information in the FE AppType/GroupId Table. Subsequently, when a UDC event notification regarding specific user data needs to be sent to a relevant Application FE, an Application FE Selector 89 then accesses the information in the FE AppType/GroupId Table to select an appropriate Application FE to receive the event notification.

Figure 8:
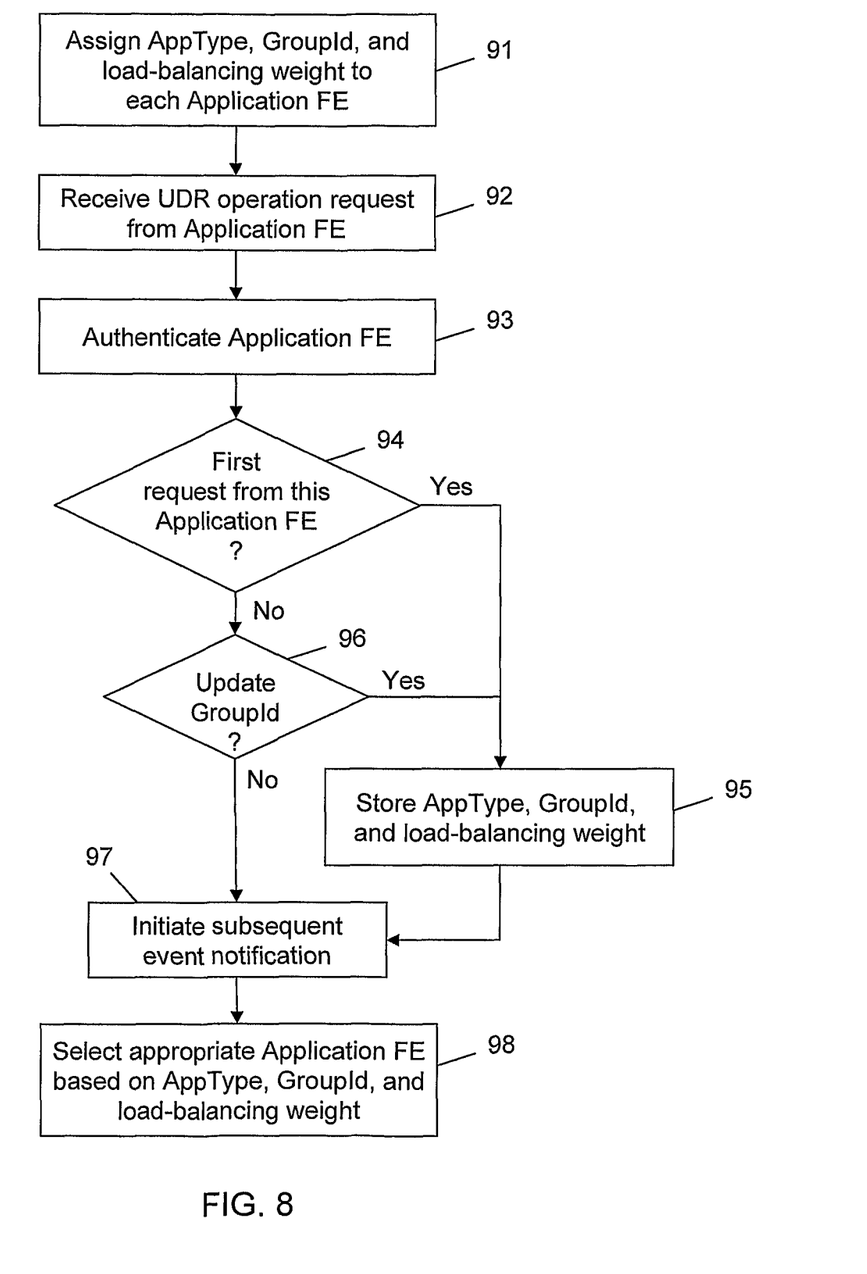
FIG. 8 is a flow chart illustrating the steps of an exemplary embodiment of the method of the present invention.

FIG. 8 is a flow chart illustrating the steps of an exemplary embodiment of the method of the present invention. At step 91, each Application FE is assigned an AppType, GroupId, and load-distribution weight as described above. At step 92, the UDR receives a UDR request from an Application FE. At step 93, the UDR authenticates the Application FE. At step 94, it is determined whether this request is the first UDR operation request received from this Application FE. If the UDR operation request is the first request received from this Application FE, the method moves to step 95 where the UDR stores an FE AppType and GroupId for the requesting Application FE. If this is not the first UDR operation request from this Application FE, the method moves to step 96 where the UDR may utilize predefined storage conditions to determine whether to store updated GroupId information for this requesting Application FE. If the request meets the predefined storage conditions, the UDR updates the GroupId information in the FE AppType/GroupId Table at 95. Subsequently, when a UDC event notification regarding specific user data needs to be sent to a relevant Application FE at 97, the UDR accesses the stored FE AppType/GroupId information and optionally uses it together with load-distribution weights to select an appropriate Application FE to receive the event notification at 98.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method in a User Data Repository (UDR) for selecting an Application Front End (Application FE) from a plurality of Application FEs in a communication network to receive an event notification, said method comprising:
   populating a database with an Application Type and Group Identifier associated with each of the plurality of Application FEs, wherein each Group Identifier identifies a different portion of the communication network accessible through the associated Application FE;
   subsequently initiating an event notification procedure to report a change of user data for an identified user; and
   selecting one of the Application FEs to receive the event notification based on the Application Type and Group Identifier.

2. The method according to claim 1, wherein populating the database comprises storing in the database, at a user level, the Application Type and Group Identifier for one of the Application FEs when a UDR operation request is received from one of the Application FEs.

3. The method according to claim 2, wherein storing in the database comprises:
   receiving the UDR operation request from a given Application FE, said request modifying user data and said request including an Application Type and Group Identifier for the given Application FE;
   determining whether the UDR operation request comprises a first UDR operation request received from the given Application FE;
   storing the Application Type and Group Identifier in the database when the UDR operation request comprises the first UDR operation request received from the given Application FE; and
   determining whether to store an updated Group Identifier when the UDR operation request does not comprise the first UDR operation request received from the given Application FE.

4. The method according to claim 3, wherein determining whether to store the updated Group Identifier comprises determining whether to store the updated Group Identifier based on predefined criteria regarding the UDR operation request.

5. The method according to claim 4, wherein determining whether to store the updated Group Identifier based on predefined criteria comprises storing the updated Group Identifier when the Application Type comprises a type associated with a portion of the network dependent upon a location of the identified user.

6. The method according to claim 4, wherein determining whether to store the updated Group Identifier based on predefined criteria comprises storing the updated Group Identifier when the UDR operation request comprises an update request or a create request.

7. The method according to claim 4, wherein determining whether to store the updated Group Identifier based on predefined criteria comprises storing the updated Group Identifier only when the user data being modified is relevant to the Group Identifier.

8. The method according to claim 4, wherein determining whether to store the updated Group Identifier based on predefined criteria comprises storing the updated Group Identifier only when the requested UDR operation was successful in the UDR.

9. The method according to claim 1, further comprising assigning a load-distribution weight to each of the plurality of Application FEs, wherein:
   a given Application FE is assigned a high load-distribution weight if the given Application FE has a direct connection to a service node serving the identified user; and
   wherein the given Application FE is assigned a low load-distribution weight if the given Application FE has only an indirect connection to the service node serving the identified user.

10. The method according to claim 9, wherein selecting one of the Application FEs to receive the event notification also includes selecting one of the Application FEs based on the assigned load-distribution weight.

11. An arrangement in a User Data Repository (UDR) for selecting an Application Front End (Application FE) from a plurality of Application FEs in a communication network to receive an event notification, said arrangement comprising:
- a storage determining unit configured to populate a database with an Application Type and Group Identifier associated with each of the plurality of Application FEs, wherein each Group Identifier identifies a different portion of the communication network accessible through the associated Application FE;
- a processor configured to subsequently initiate an event notification procedure to report a change of user data for an identified user; and
- an Application FE selector configured to select one of the Application FEs to receive the event notification based on the Application Type and Group Identifier.

12. The arrangement according to claim 11, wherein the storage determining unit is configured to store in the database, at a user level, the Application Type and Group Identifier for one of the Application FEs when a UDR operation request is received from one of the Application FEs.

13. The arrangement according to claim 12, further comprising:
- an interface unit configured to receive the UDR operation request from a given Application FE, said request modifying user data and said request including an Application Type and Group Identifier for the given Application FE;
- wherein the storage determining unit is configured to determine whether the UDR operation request comprises a first UDR operation request received from the given Application FE; and
- wherein the storage determining unit is configured to determine whether to store the Application Type and Group Identifier in the database when the UDR operation request comprises the first UDR operation request received from the given Application FE, and to determine whether to store an updated Group Identifier when the UDR operation request does not comprise the first UDR operation request received from the given Application FE.

14. The arrangement according to claim 13, wherein the storage determining unit determines whether to store the updated Group Identifier based on predefined criteria regarding the UDR operation request.

15. The arrangement according to claim 14:
- wherein one of the predetermined criteria comprises the Application Type of the given Application FE; and
- wherein the storage determining unit is configured to store the updated Group Identifier when the Application Type comprises a type associated with a portion of the network dependent upon a location of the identified user.

16. The arrangement according to claim 14:
- wherein one of the predetermined criteria comprises a type of UDR operation request received; and
- wherein the storage determining unit is configured to store the updated Group Identifier when the UDR operation request comprises an update request or a create request.

17. The arrangement according to claim 14:
- wherein one of the predetermined criteria comprises a relevance of the modified user data to the Group Identifier; and
- wherein the storage determining unit is configured to store the updated Group Identifier only when the user data being modified is relevant to the Group Identifier.

18. The arrangement according to claim 14:
- wherein one of the predetermined criteria comprises the success or failure of the requested UDR operation; and
- wherein the storage determining unit is configured to store the updated Group Identifier only when the requested UDR operation was successful in the UDR.

19. The arrangement according to claim 11:
- wherein the Application FE selector is further configured to select the Application FE based on load-distribution weights assigned to each of the plurality of Application Fes;
- wherein a given Application FE is assigned a high load-distribution weight if the given Application FE has a direct connection to a service node serving the identified user; and
- wherein the given Application FE is assigned a low load-distribution weight if the given Application FE has only an indirect connection to the service node serving the identified user.

\* \* \* \* \*